United States Patent
Zhang et al.

(10) Patent No.: US 12,231,181 B2
(45) Date of Patent: Feb. 18, 2025

(54) IDLE MODE THROUGHPUT PROJECTION USING PHYSICAL LAYER MEASUREMENTS

(71) Applicant: QUALCOMM Incorporated, San Diego, CA (US)

(72) Inventors: Xinchen Zhang, San Diego, CA (US); Arnaud Meylan, San Diego, CA (US); Mahdi Zamani, San Diego, CA (US); Arvind Vardarajan Santhanam, San Diego, CA (US); Mona Agrawal, San Diego, CA (US); Reza Shahidi, La Jolla, CA (US)

(*) Notice: Subject to any disclaimer, the term of this patent is extended or adjusted under 35 U.S.C. 154(b) by 410 days.

(21) Appl. No.: 17/860,896

(22) Filed: Jul. 8, 2022

(65) Prior Publication Data

US 2024/0014910 A1    Jan. 11, 2024

(51) Int. Cl.
  *H04W 72/04*    (2023.01)
  *H04B 17/309*   (2015.01)
  *H04W 24/02*    (2009.01)
  *H04W 48/16*    (2009.01)

(52) U.S. Cl.
  CPC .......... *H04B 17/309* (2015.01); *H04W 24/02* (2013.01); *H04W 48/16* (2013.01)

(58) Field of Classification Search
  CPC ..... H04B 17/309; H04W 24/02; H04W 48/16
  See application file for complete search history.

(56) References Cited

U.S. PATENT DOCUMENTS

| | | | |
|---|---|---|---|
| 2007/0147317 A1* | 6/2007 | Smith | H04W 48/18 370/338 |
| 2014/0064187 A1* | 3/2014 | Yokoyama | H04W 28/18 370/328 |
| 2014/0254405 A1* | 9/2014 | Mellein | H04W 24/02 370/252 |
| 2014/0334318 A1* | 11/2014 | Pica | H04W 24/02 370/252 |
| 2020/0077285 A1* | 3/2020 | Yu | H04W 72/12 |
| 2021/0337398 A1* | 10/2021 | Kumar | H04W 24/08 |
| 2022/0225196 A1* | 7/2022 | Marupaduga | H04W 36/0085 |
| 2023/0164654 A1* | 5/2023 | Marupaduga | H04W 36/008355 370/331 |

FOREIGN PATENT DOCUMENTS

EP    3316628 A1 *   5/2018    ......... H04B 17/336

* cited by examiner

*Primary Examiner* — Mahbubul Bar Chowdhury

(57) ABSTRACT

Disclosed are systems and techniques for wireless communications. For instance, a wireless device may receive a signal from a first wireless network while the wireless device is in an idle mode; determine, from the received signal, a signal to noise ratio (SNR) and a doppler shift; retrieve stored network capability information; and estimate, based on the SNR, the doppler shift, and the stored network capability information, a throughput of the first wireless network.

30 Claims, 9 Drawing Sheets

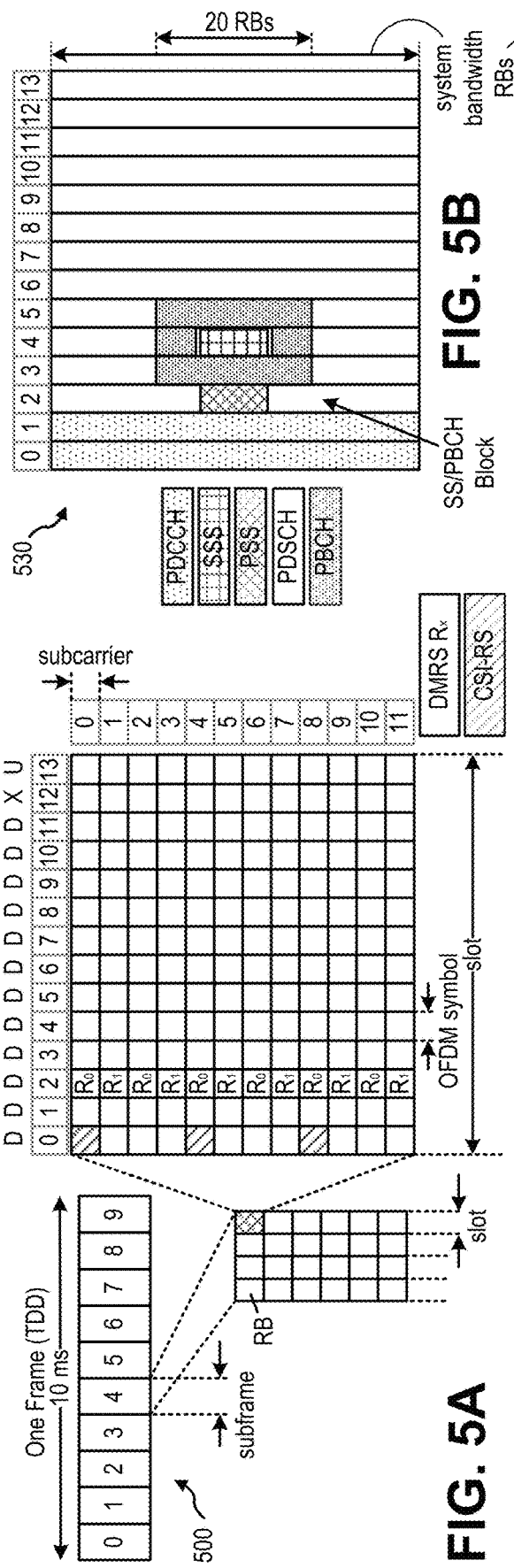
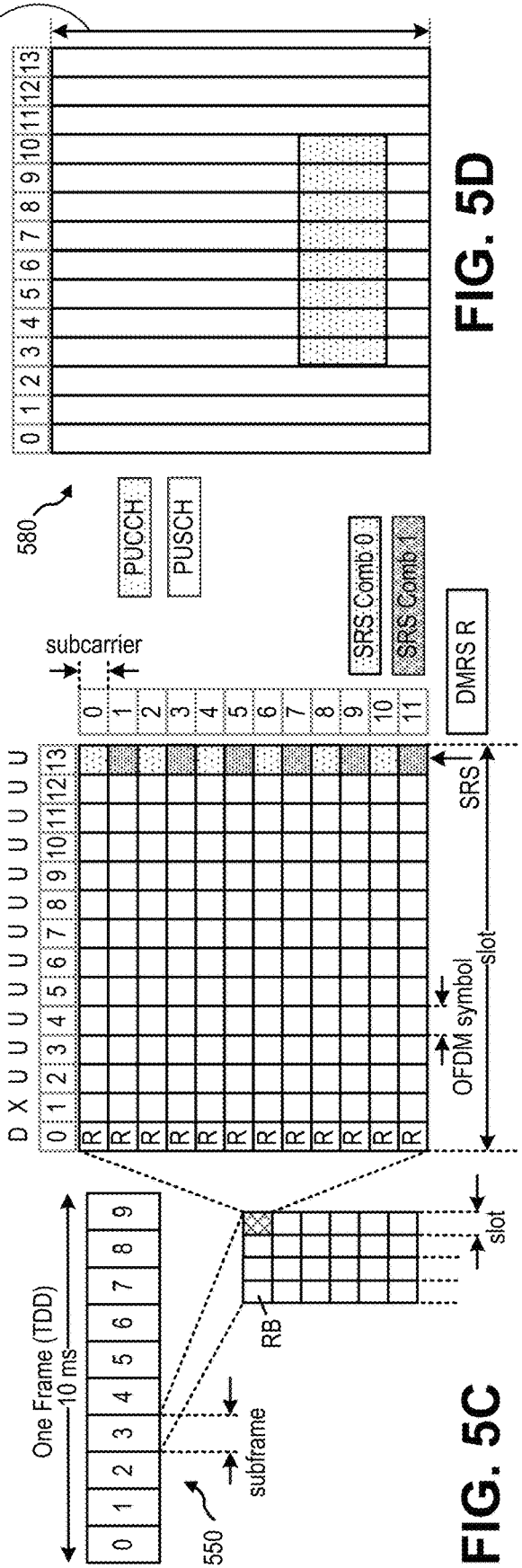

IDLE MODE THROUGHPUT PROJECTION USING PHYSICAL LAYER MEASUREMENTS

FIELD

The present disclosure generally relates to wireless communications. For example, aspects of the present disclosure relate to systems and techniques for idle mode throughput projection (e.g., estimation) using physical (PHY) layer measurements.

BACKGROUND

Wireless communications systems are deployed to provide various telecommunications and data services, including telephony, video, data, messaging, and broadcasts. Broadband wireless communications systems have developed through various generations, including a first-generation analog wireless phone service (1G), a second-generation (2G) digital wireless phone service (including interim 2.5G networks), a third-generation (3G) high speed data, Internet-capable wireless device, and a fourth-generation (4G) service (e.g., Long-Term Evolution (LTE), WiMax). Examples of wireless communications systems include code division multiple access (CDMA) systems, time division multiple access (TDMA) systems, frequency division multiple access (FDMA) systems, orthogonal frequency division multiple access (OFDMA) systems, Global System for Mobile communication (GSM) systems, etc. Other wireless communications technologies include 802.11 Wi-Fi, Bluetooth, among others.

A fifth-generation (5G) mobile standard calls for higher data transfer speeds, greater number of connections, and better coverage, among other improvements. The 5G standard (also referred to as "New Radio" or "NR"), according to Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments.

Although wireless communication systems have made great technological advancements over many years, challenges still exist. For example, complex and dynamic environments can still attenuate or block signals between wireless transmitters and wireless receivers, undermining a throughput a wireless device is able to achieve to a particular wireless network, given the wireless nodes that can be used to access the wireless network. Consequently, an ability of a wireless device, such as user equipment (UE) to select from multiple wireless networks, such from among a 5G and another wireless network, or from among multiple 5G networks should be enhanced.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Disclosed are systems, methods, apparatuses, and computer-readable media for performing wireless communications. In one illustrative example, an apparatus for wireless communications is provided that includes at least one memory and at least one processor (e.g., implemented in circuitry) coupled to the at least one memory and configured to: receive, a signal from a first wireless network while the apparatus is in an idle mode; determine, from the received signal, a signal to noise ratio (SNR) and a doppler shift; retrieve stored network capability information; and estimate, based on the SNR, the doppler shift, and the stored network capability information, a throughput of the first wireless network.

In another example, a method for wireless communications is provided. In some aspects, the method may be performed by user equipment (UE). The method includes: receiving, by a wireless device, a signal from a first wireless network while the wireless device is in an idle mode; determining, from the received signal, a signal to noise ratio (SNR) and a doppler shift; retrieving stored network capability information; and estimating, based on the SNR, the doppler shift, and the stored network capability information, a throughput of the first wireless network.

In another example, a non-transitory computer-readable medium is provided for performing wireless communications, which has stored thereon instructions that, when executed by one or more processors, cause the one or more processors to: receive a signal from a first wireless network while a wireless device is in an idle mode; determine, from the received signal, a signal to noise ratio (SNR) and a doppler shift; retrieve stored network capability information; and estimate, based on the SNR, the doppler shift, and the stored network capability information, a throughput of the first wireless network.

In another example, an apparatus is provided for wireless communications. The apparatus includes: means for receiving a signal from a first wireless network while the apparatus is in an idle mode; means for determining, from the received signal, a signal to noise ratio (SNR) and a doppler shift; means for retrieving stored network capability information; and means for estimating, based on the SNR, the doppler shift, and the stored network capability information, a throughput of the first wireless network.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

Other objects and advantages associated with the aspects disclosed herein will be apparent to those skilled in the art based on the accompanying drawings and detailed description.

BRIEF DESCRIPTION OF THE DRAWINGS

Examples of various implementations are described in detail below with reference to the following figures:

FIGS. 5A-5D depict various example aspects of data structures for a wireless communication network, in accordance with some examples;

DETAILED DESCRIPTION

Figure 1:
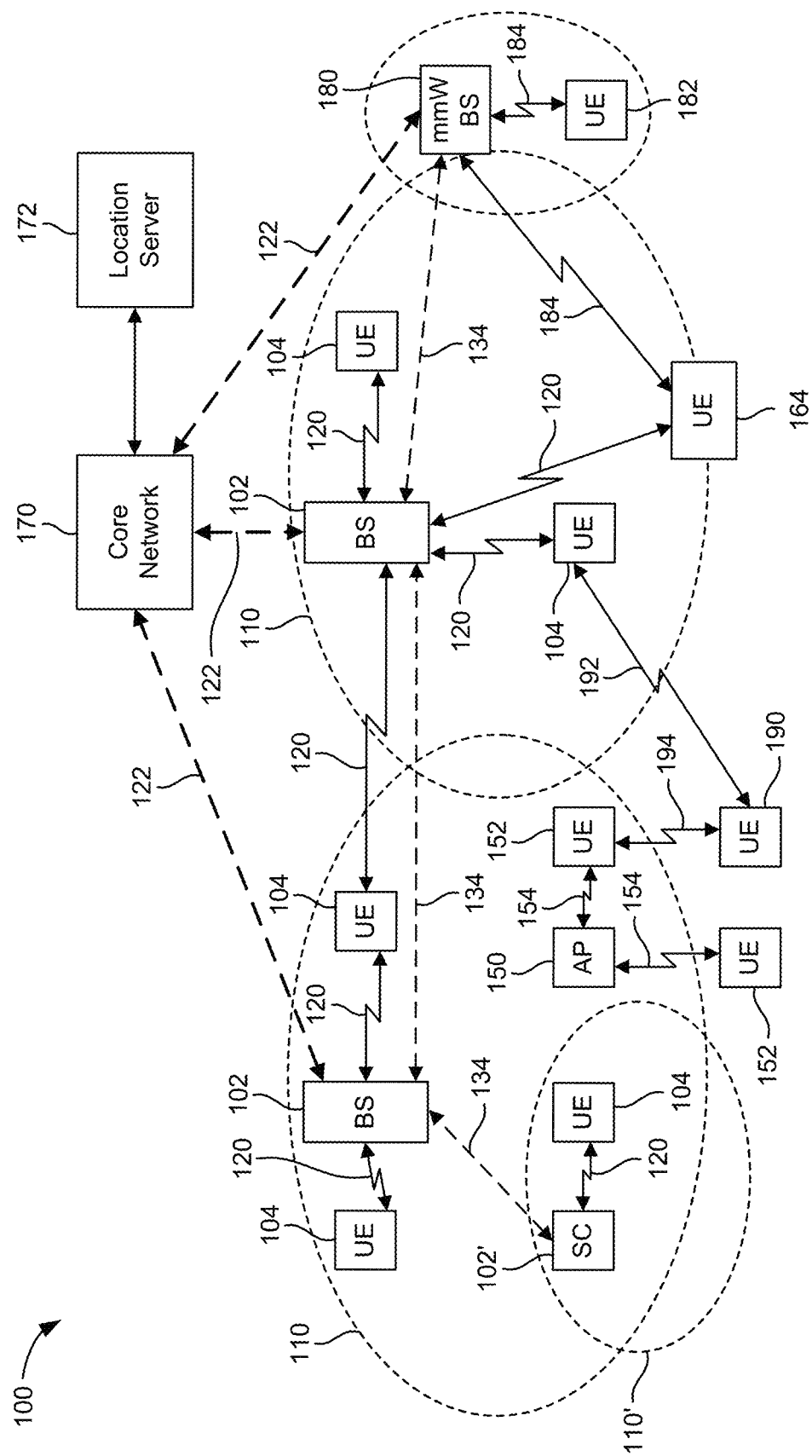
FIG. 1 is a block diagram illustrating an example of a wireless communication network, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

As noted above, techniques and systems are described herein for estimating a throughput of a wireless network by a wireless device in an idle mode. Generally, a wireless device connected to a wireless network can accurately estimate a throughput of the wireless network as the wireless device and wireless network cooperate to make a variety of measurements of signals between the wireless device and wireless network. However, when a wireless device is in an idle mode and disconnected from a wireless network, substantially fewer measurements of signals are available. In accordance with aspects of the present disclosure, a throughput of a wireless network may be estimated by a wireless device in an idle mode. This estimated throughput may be determined based on certain physical (PHY) layer measurements of signals broadcast from the wireless network and stored network capability information. This stored network capability information may be obtained based on a previous connection with the corresponding wireless network, or by accessing an online shared database.

Additional aspects of the present disclosure are described in more detail below.

Wireless networks are deployed to provide various communication services, such as voice, video, packet data, messaging, broadcast, and the like. A wireless network may support both access links for communication between wireless devices. An access link may refer to any communication link between a client device (e.g., a user equipment (UE), a station (STA), or other client device) and a base station (e.g., a 3GPP gNodeB (gNB) for 5G/NR, a 3GPP eNodeB (eNB) for LTE, a Wi-Fi access point (AP), or other base station) or a component of a disaggregated base station (e.g., a central unit, a distributed unit, and/or a radio unit). In one example, an access link between a UE and a 3GPP gNB may be over a Uu interface. In some cases, an access link may support uplink signaling, downlink signaling, connection procedures, etc.

In some aspects, wireless communications networks may be implemented using one or more modulation schemes. For example, a wireless communication network may be implemented using a quadrature amplitude modulation (QAM) scheme such as 16QAM, 32QAM, 64QAM, etc.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs may communicate with a core network via a RAN, and through the core network the UEs may be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

A network entity may be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) MC. A base station (e.g., with an aggregated/monolithic base station architecture or disaggregated base station architecture) may operate according to one of several RATs in communication with UEs depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs may send signals to a base station is called an uplink (UL) channel (e.g., a reverse traffic channel, a reverse control channel, an access channel, etc.). A communication link through which the base station may send signals to UEs is called a downlink (DL) or forward link channel (e.g., a paging channel, a control channel, a broadcast channel, or a forward traffic channel, etc.). The term traffic channel (TCH), as used herein, may refer to either an uplink, reverse or downlink, and/or a forward traffic channel.

The term "network entity" or "base station" (e.g., with an aggregated/monolithic base station architecture or disaggregated base station architecture) may refer to a single physical transmit receive point (TRP) or to multiple physical TRPs that may or may not be co-located. For example, where the term "network entity" or "base station" refers to a single physical TRP, the physical TRP may be an antenna of the base station corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An RF signal comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

Various aspects of the systems and techniques described herein will be discussed below with respect to the figures. According to various aspects, FIG. 1 illustrates an example of a wireless communications system 100. The wireless communications system 100 (which may also be referred to as a wireless wide area network (WWAN)) may include various base stations 102 and various UEs 104. In some aspects, the base stations 102 may also be referred to as "network entities" or "network nodes." One or more of the base stations 102 may be implemented in an aggregated or monolithic base station architecture. Additionally, or alternatively, one or more of the base stations 102 may be implemented in a disaggregated base station architecture, and may include one or more of a central unit (CU), a distributed unit (DU), a radio unit (RU), a Near-Real Time (Near-RT) RAN Intelligent Controller (MC), or a Non-Real Time (Non-RT) MC. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to a long term evolution (LTE) network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (MM), paging, positioning, and delivery of warning messages. The base stations 102 may communicate with each other directly or indirectly (e.g., through the EPC or 5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency may be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed sub scriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a WLAN AP 150 in communication with WLAN stations (STAs) 152 via communication links 154 in an unlicensed frequency spectrum (e.g., 5 Gigahertz (GHz)). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 may include devices (e.g., UEs, etc.) that communicate with one or more UEs 104, base stations 102, APs 150, etc. utilizing the ultra-wideband (UWB) spectrum. The UWB spectrum may range from 3.1 to 10.5 GHz.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. The mmW base station 180 may be implemented in an aggregated or monolithic base station architecture, or alternatively, in a disaggregated base station architecture (e.g., including one or more of a CU, a DU, a RU, a Near-RT RIC, or a Non-RT RIC). Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW and/or near mmW radio frequency band have high path loss and a relatively short range. The mmW base station 180 and the UE 182 may utilize beamforming (transmit and/or receive) over an mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

In some aspects relating to 5G, the frequency spectrum in which wireless network nodes or entities (e.g., base stations 102/180, UEs 104/182) operate is divided into multiple frequency ranges, FR1 (from 450 to 6000 Megahertz (MHz)), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency and/or component carrier over which some base station is communicating, the term "cell," "serving cell," "component carrier," "carrier frequency," and the like may be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). In carrier aggregation, the base stations 102 and/or the UEs 104 may use spectrum up to Y MHz (e.g., 5, 10, 15, 20, 100 MHz) bandwidth per carrier up to a total of Yx MHz (x component carriers) for transmission in each direction. The component carriers may or may not be adjacent to each other on the frequency spectrum. Allocation of carriers may be asymmetric with respect to the downlink and uplink (e.g., more or less carriers may be allocated for downlink than for uplink). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In order to operate on multiple carrier frequencies, a base station 102 and/or a UE 104 may be equipped with multiple receivers and/or transmitters. For example, a UE 104 may have two receivers, "Receiver 1" and "Receiver 2," where "Receiver 1" is a multi-band receiver that may be tuned to band (i.e., carrier frequency) 'X' or band 'Y,' and "Receiver 2" is a one-band receiver tuneable to band 'Z' only. In this example, if the UE 104 is being served in band 'X,' band 'X' would be referred to as the PCell or the active carrier frequency, and "Receiver 1" would need to tune from band 'X' to band 'Y' (an SCell) in order to measure band 'Y' (and vice versa). In contrast, whether the UE 104 is being served in band 'X' or band 'Y,' because of the separate "Receiver 2," the UE 104 may measure band 'Z' without interrupting the service on band 'X' or band 'Y.'

The wireless communications system 100 may further include a UE 164 that may communicate with a macro cell base station 102 over a communication link 120 and/or the mmW base station 180 over an mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), Wi-Fi Direct (Wi-Fi-D), Bluetooth®, and so on.

Figure 2:
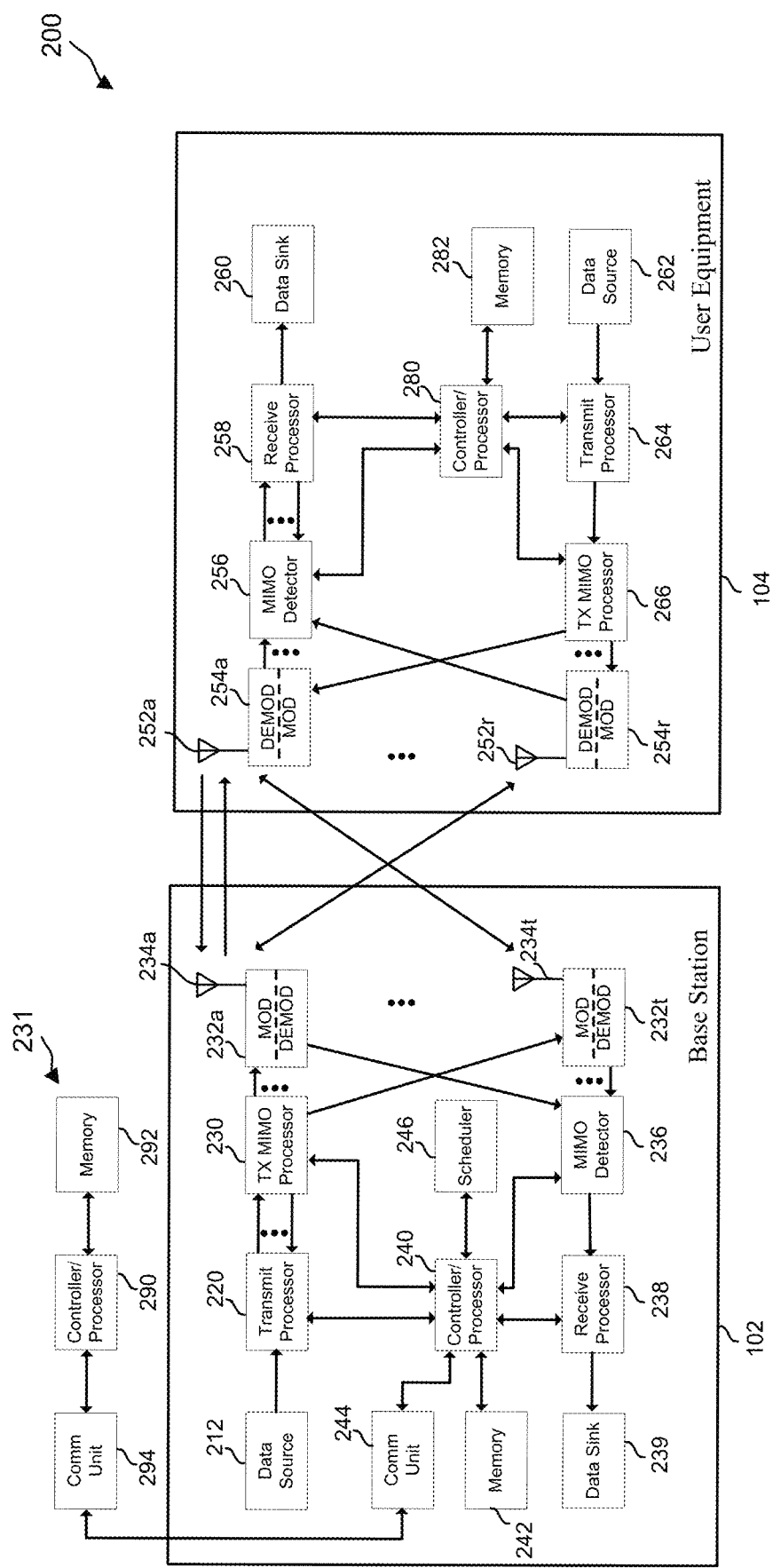
FIG. 2 is a diagram illustrating a design of a base station and a User Equipment (UE) device that enable transmission and processing of signals exchanged between the UE and the base station, in accordance with some examples.

FIG. 2 shows a block diagram of a design of a base station 102 and a UE 104 that enable transmission and processing of signals exchanged between the UE and the base station, in accordance with some aspects of the present disclosure. Design 200 includes components of a base station 102 and a UE 104, which may be one of the base stations 102 and one of the UEs 104 in FIG. 1. Base station 102 may be equipped with T antennas 234a through 234t, and UE 104 may be equipped with R antennas 252a through 252r, where in general T>1 and R>1.

At base station 102, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. The modulators 232a through 232t are shown as a combined modulator-demodulator (MOD-DEMOD). In some cases, the modulators and demodulators may be separate components. Each modulator of the modulators 232a to 232t may process a respective output symbol stream, e.g., for an orthogonal frequency-division multiplexing (OFDM) scheme and/or the like, to obtain an output sample stream. Each modulator of the modulators 232a to 232t may further process (e.g., convert to analog, amplify, filter, and upconvert) the output sample stream to obtain a downlink signal. T downlink signals may be transmitted from modulators 232a to 232t via T antennas 234a through 234t, respectively. According to certain aspects described in more detail below, the synchronization signals may be generated with location encoding to convey additional information.

At UE 104, antennas 252a through 252r may receive the downlink signals from base station 102 and/or other base stations and may provide received signals to demodulators (DEMODs) 254a through 254r, respectively. The demodulators 254a through 254r are shown as a combined modulator-demodulator (MOD-DEMOD). In some cases, the modulators and demodulators may be separate components. Each demodulator of the demodulators 254a through 254r may condition (e.g., filter, amplify, downconvert, and digitize) a received signal to obtain input samples. Each demodulator of the demodulators 254a through 254r may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 104 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 104, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals (e.g., based at least in part on a beta value or a set of beta values associated with the one or more reference signals). The symbols from transmit processor 264 may be precoded by a TX-MIMO processor 266 if application, further processed by modulators 254a through 254r (e.g., for DFT-s-OFDM, CP-OFDM, and/or the like), and transmitted to base station 102. At base station 102, the uplink signals from UE 104 and other UEs may be received by antennas 234a through 234t, processed by demodulators 232a through 232t, detected by a MIMO detector 236 if applicable, and further processed by a receive processor 238 to obtain decoded data and control information sent by UE 104. Receive processor 238 may provide the decoded data to a data sink 239 and the decoded control information to controller (processor) 240. Base station 102 may include communication unit 244 and communicate to a network controller 231 via communication unit 244. Network controller 231 may include communication unit 294, controller/processor 290, and memory 292.

In some aspects, one or more components of UE 104 may be included in a housing. Controller 240 of base station 102, controller/processor 280 of UE 104, and/or any other component(s) of FIG. 2 may perform one or more techniques associated with implicit UCI beta value determination for NR.

Memories 242 and 282 may store data and program codes for the base station 102 and the UE 104, respectively. A scheduler 246 may schedule UEs for data transmission on the downlink, uplink, and/or sidelink.

In some aspects, deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also may be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which may enable flexibility in network design. The various units of the disaggregated base station, or disaggregated RAN architecture, may be configured for wired or wireless communication with at least one other unit.

Figure 3:
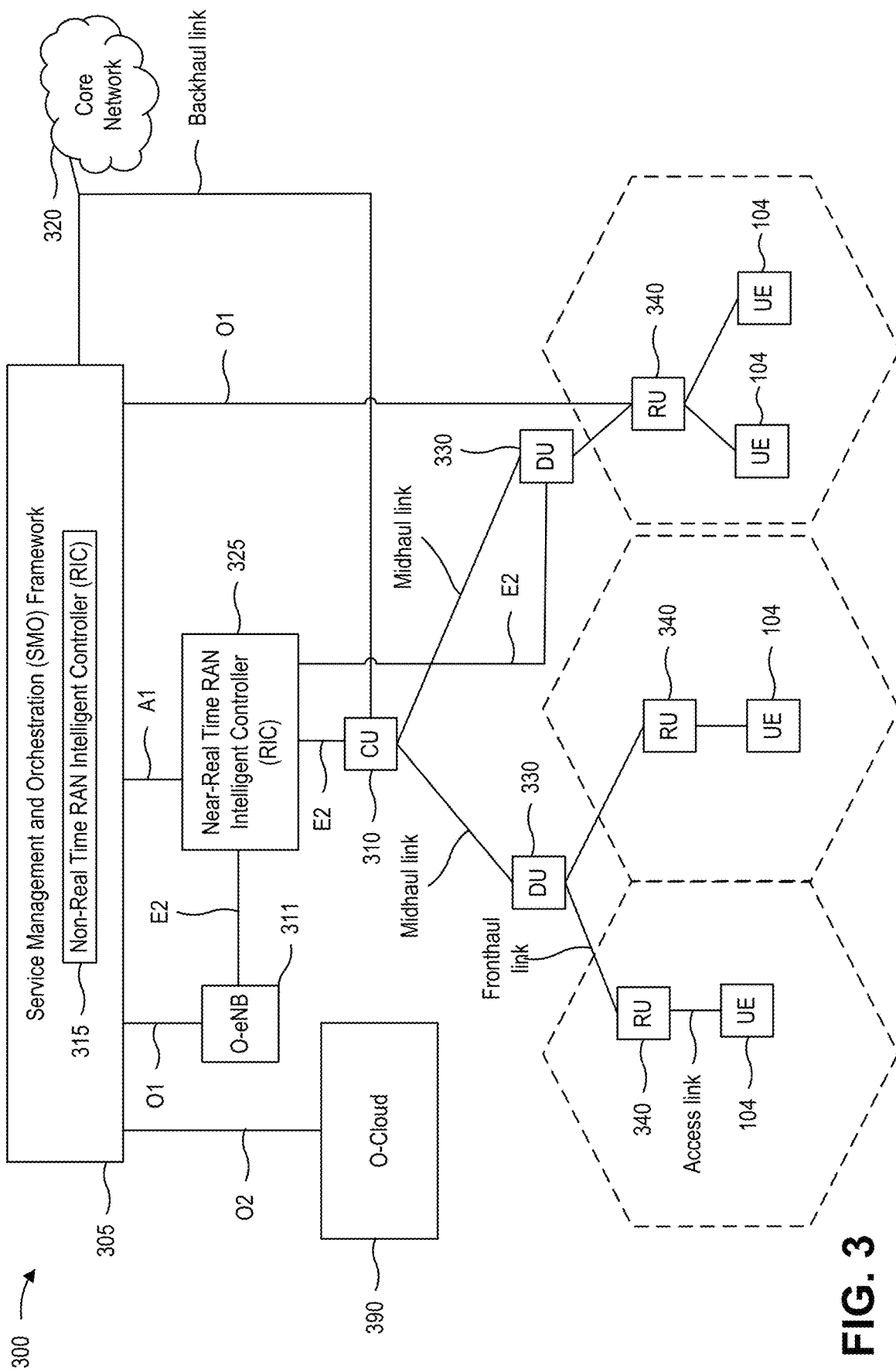
FIG. 3 is a diagram illustrating an example of a disaggregated base station, in accordance with some examples.

FIG. 3 shows a diagram illustrating an example disaggregated base station 300 architecture. The disaggregated base station 300 architecture may include one or more central units (CUs) 310 that may communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 104 via one or more radio frequency (RF) access links. In some implementations, the UE 104 may be simultaneously served by multiple RUs 340.

Each of the units, e.g., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, may be configured to communicate with one or more of the other units via the transmission medium. For example, the units may include a wired interface configured to receive or transmit signals over a wired transmission medium to one or more of the other units. Additionally, the units may include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions may include radio resource control (RRC), packet data convergence protocol (PDCP), service data adaptation protocol (SDAP), or the like. Each control function may be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 may be logically split into one or more CU-UP units and one or more CU-CP units. The CU-UP unit may communicate bidirectionally with the CU-CP unit via an interface, such as the E1 interface when implemented in an O-RAN configuration. The CU 310 may be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low PHY layers. Each layer (or module) may be implemented with an interface configured to communicate signals with other layers (and modules) hosted by the DU 330, or with the control functions hosted by the CU 310.

Lower-layer functionality may be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 may be implemented to handle over the air (OTA) communication with one or more UEs 104. In some implementations, real-time and non-real-time aspects of control and user plane communication with the RU(s) 340 may be controlled by the corresponding DU 330. In some scenarios, this configuration may enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements may include, but are not limited to, CUs 310, DUs 330, RUs 340 and Near-RT RICs 325. In some implementations, the SMO Framework 305 may communicate with a hardware aspect of a 4G RAN, such as an open eNB (O-eNB) 311, via an O1 interface. Additionally, in some implementations, the SMO Framework 305 may communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an Al interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate Al/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT MC 315 or the Near-RT RIC 325 may be configured to tune RAN behavior or performance. For example, the Non-RT RIC 315 may monitor long-term trends and patterns for performance and employ Al/ML models to perform corrective actions through the SMO Framework 305 (such as reconfiguration via O1) or via creation of RAN management policies (such as A1 policies).

Figure 4:
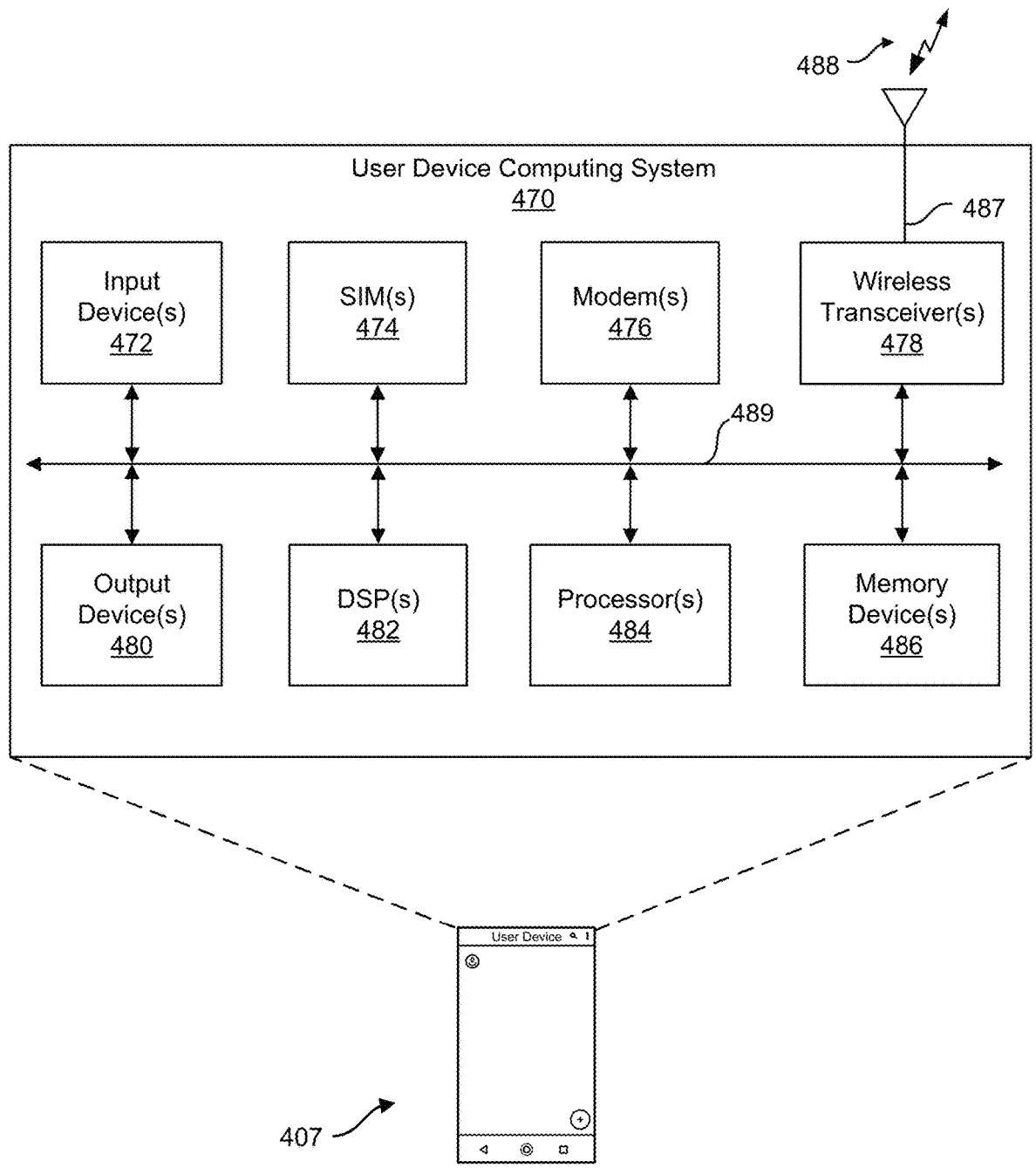
FIG. 4 is a block diagram illustrating components of a user equipment, in accordance with some examples.

FIG. 4 illustrates an example of a computing system 470 of a wireless device 407. The wireless device 407 may include a client device such as a UE (e.g., UE 104, UE 152, UE 190) or other type of device (e.g., a station (STA) configured to communication using a Wi-Fi interface) that may be used by an end-user. For example, the wireless device 407 may include a mobile phone, router, tablet computer, laptop computer, tracking device, wearable device (e.g., a smart watch, glasses, an extended reality (XR) device such as a virtual reality (VR), augmented reality (AR) or mixed reality (MR) device, etc.), Internet of Things (IoT) device, access point, and/or another device that is configured to communicate over a wireless communications network. The computing system 470 includes software and hardware components that may be electrically or communicatively coupled via a bus 489 (or may otherwise be in communication, as appropriate). For example, the computing system 470 includes one or more processors 484. The one or more processors 484 may include one or more CPUs, ASICs, FPGAs, APs, GPUs, VPUs, NSPs, microcontrollers, dedicated hardware, any combination thereof, and/or other processing device or system. The bus 489 may be used by the one or more processors 484 to communicate between cores and/or with the one or more memory devices 486.

The computing system 470 may also include one or more memory devices 486, one or more digital signal processors (DSPs) 482, one or more subscriber identity modules (SIMs) 474, one or more modems 476, one or more wireless transceivers 478, one or more antennas 487, one or more input devices 472 (e.g., a camera, a mouse, a keyboard, a touch sensitive screen, a touch pad, a keypad, a microphone, and/or the like), and one or more output devices 480 (e.g., a display, a speaker, a printer, and/or the like).

In some aspects, computing system 470 may include one or more radio frequency (RF) interfaces configured to transmit and/or receive RF signals. In some examples, an RF interface may include components such as modem(s) 476, wireless transceiver(s) 478, and/or antennas 487. The one or more wireless transceivers 478 may transmit and receive wireless signals (e.g., signal 488) via antenna 487 from one or more other devices, such as other wireless devices, network devices (e.g., base stations such as eNBs and/or gNBs, Wi-Fi access points (APs) such as routers, range extenders or the like, etc.), cloud networks, and/or the like. In some examples, the computing system 470 may include multiple antennas or an antenna array that may facilitate simultaneous transmit and receive functionality. Antenna 487 may be an omnidirectional antenna such that radio frequency (RF) signals may be received from and transmitted in all directions. The wireless signal 488 may be transmitted via a wireless network. The wireless network may be any wireless network, such as a cellular or telecommunications network (e.g., 3G, 4G, 5G, etc.), wireless local area network (e.g., a Wi-Fi network), a Bluetooth™ network, and/or other network.

In some examples, the wireless signal 488 may be transmitted directly to other wireless devices using sidelink communications (e.g., using a PC5 interface, using a DSRC interface, etc.). Wireless transceivers 478 may be configured to transmit RF signals for performing sidelink communications via antenna 487 in accordance with one or more transmit power parameters that may be associated with one or more regulation modes. Wireless transceivers 478 may also be configured to receive sidelink communication signals having different signal parameters from other wireless devices.

In some examples, the one or more wireless transceivers 478 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end may generally handle selection and conversion of the wireless signals 488 into a baseband or intermediate frequency and may convert the RF signals to the digital domain.

In some cases, the computing system 470 may include a coding-decoding device (or CODEC) configured to encode and/or decode data transmitted and/or received using the one or more wireless transceivers 478. In some cases, the computing system 470 may include an encryption-decryption device or component configured to encrypt and/or decrypt data (e.g., according to the AES and/or DES standard) transmitted and/or received by the one or more wireless transceivers 478.

The one or more SIMs 474 may each securely store an international mobile subscriber identity (IMSI) number and related key assigned to the user of the wireless device 407. The IMSI and key may be used to identify and authenticate the subscriber when accessing a network provided by a network service provider or operator associated with the one or more SIMS 474. The one or more modems 476 may modulate one or more signals to encode information for transmission using the one or more wireless transceivers 478. The one or more modems 476 may also demodulate signals received by the one or more wireless transceivers 478 in order to decode the transmitted information. In some examples, the one or more modems 476 may include a Wi-Fi modem, a 4G (or LTE) modem, a 5G (or NR) modem, and/or other types of modems. The one or more modems 476 and the one or more wireless transceivers 478 may be used for communicating data for the one or more SIMs 474.

The computing system 470 may also include (and/or be in communication with) one or more non-transitory machine-readable storage media or storage devices (e.g., one or more memory devices 486), which may include, without limitation, local and/or network accessible storage, a disk drive, a drive array, an optical storage device, a solid-state storage device such as a RAM and/or a ROM, which may be programmable, flash-updateable and/or the like. Such storage devices may be configured to implement any appropriate data storage, including without limitation, various file systems, database structures, and/or the like.

In various embodiments, functions may be stored as one or more computer-program products (e.g., instructions or code) in memory device(s) 486 and executed by the one or more processor(s) 484 and/or the one or more DSPs 482. The computing system 470 may also include software elements (e.g., located within the one or more memory devices 486), including, for example, an operating system, device drivers, executable libraries, and/or other code, such as one or more application programs, which may comprise computer programs implementing the functions provided by various embodiments, and/or may be designed to implement methods and/or configure systems, as described herein.

FIGS. 5A-5D depict various example aspects of data structures for a wireless communication system, such as wireless communication system 100 of FIG. 1. FIGS. 5A-5D depict aspects of data structures for a wireless communication network, such as wireless communication network 100 of FIG. 1. In particular, FIG. 5A is a diagram 500 illustrating an example of a first subframe within a 5G (e.g., 5G NR) frame structure, FIG. 5B is a diagram 530 illustrating an example of DL channels within a 5G subframe, FIG. 5C is a diagram 550 illustrating an example of a second subframe within a 5G frame structure, and FIG. 5D is a diagram 580 illustrating an example of UL channels within a 5G subframe.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 5A and 5C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and μ slots/subframe. The subcarrier spacing and symbol length/duration are a function of the numerology. The subcarrier spacing may be equal to $2^\mu \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 5A-5D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 5A, some of the REs carry reference (pilot) signals (RS) for a UE (e.g., UE 104, UE 152, UE 190). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 5B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., UE 104, UE 152, UE 190) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 5C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 5D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Generally, different service providers operate different wireless networks. In some cases, a single service provider may also operate multiple wireless networks where the wireless networks use different radio access technologies (RATs), such as LTE, 5G NR, Wi-Fi, etc. In some cases, a wireless device that is not connected to one or more wireless networks may be in an idle mode. In an idle state, the wireless device is not registered (e.g., authenticated/associated) with one or more wireless networks of a service provider (e.g., wireless network operator). Examples of idle mode include when a device is in an RRC Idle state with respect to a wireless network, when a device is not authenticated and/or associated with an AP, etc. In cases where a wireless device is capable of maintaining multiple wireless connections to multiple wireless networks, the wireless device may be in idle mode with respect to a first wireless network and be in another state, such as a connected state, with respect to a second wireless network. For example, a wireless device with dual subscriber identity modules (SIMs) may be connected to (e.g., in a connected mode such as RRC_Connected) a first wireless network via a first SIM and in idle mode with respect to the second SIM. Similarly, another wireless device can be connected to a cellular wireless network while in an idle state with respect to Wi-Fi networks. In some cases, a wireless device in idle mode (e.g., idle state) may monitor a wireless medium for broadcast and paging messages (e.g., on the PBCH for the PSS/SSS, etc., and the PDSCH) from wireless networks. Generally, the wireless device in idle mode can only transmit a limited set of messages, such as a connection message to establish a connection, to a wireless network that the wireless device is not already connected to.

In idle mode, the wireless device may be able to make limited measurements of signals received from the wireless networks, but the wireless device may not be able to exchange messages with the wireless networks to help perform more detailed signal measurements. In some cases, these measurements are physical (PHY) layer measurements that are performed without accessing higher layer operations. For example, the wireless device PHY layer may be able to make a reference signal received power (RSRP), received signal strength indication (RSSI), signal-to-noise (SNR), doppler spread, delay spread, etc. measurements of a beacon or other reference signal, but may not make measurements which require feedback to/from or other cooperation with the wireless network.

In many cases, a wireless device can accurately project a throughput available while connected to the wireless network through a particular access cell via channel status information (CSI) such as CQI feedback, DCI information, etc. However, this CSI information is generally only available while in connected mode where the wireless network is aware of and signaling to the wireless device. A wireless device in idle mode is typically limited to measurements of reference signals from wireless networks, such as a synchronization signal block (SSB) broadcast, while in idle mode, and the wireless device may not be able to accurately evaluate a possible throughput of a wireless network. While a wireless device may be able to measure a RSSP/RSSI/SNR of a reference signal sent by a wireless network, a measurement of how strong a received signal is does not necessarily reflect the throughput possible on the wireless network. For example, a wireless network with a 20 MHz channel width and a strong signal (e.g., as measured by RSSP/RSSI/SNR) may still deliver less throughput than another wireless network with an 80 MHz channel width and a relatively weaker signal (e.g., as measured by RSSP/RSSI/SNR). Additionally, without establishing a connection to a wireless network through a cell, the wireless device may not be able to determine how the wireless connection (e.g., the cell) is configured (e.g., available channel width, number of component carriers, QAM configuration, etc.). This possible throughput information may be useful to the wireless device when deciding, for example, whether to switch and/or connect to another wireless network. In accordance with aspects of the present disclosure, a technique for idle mode throughput estimation may be provided which uses PHY layer measurements to help estimate an amount of throughput that may be available from various wireless networks.

Figure 6:
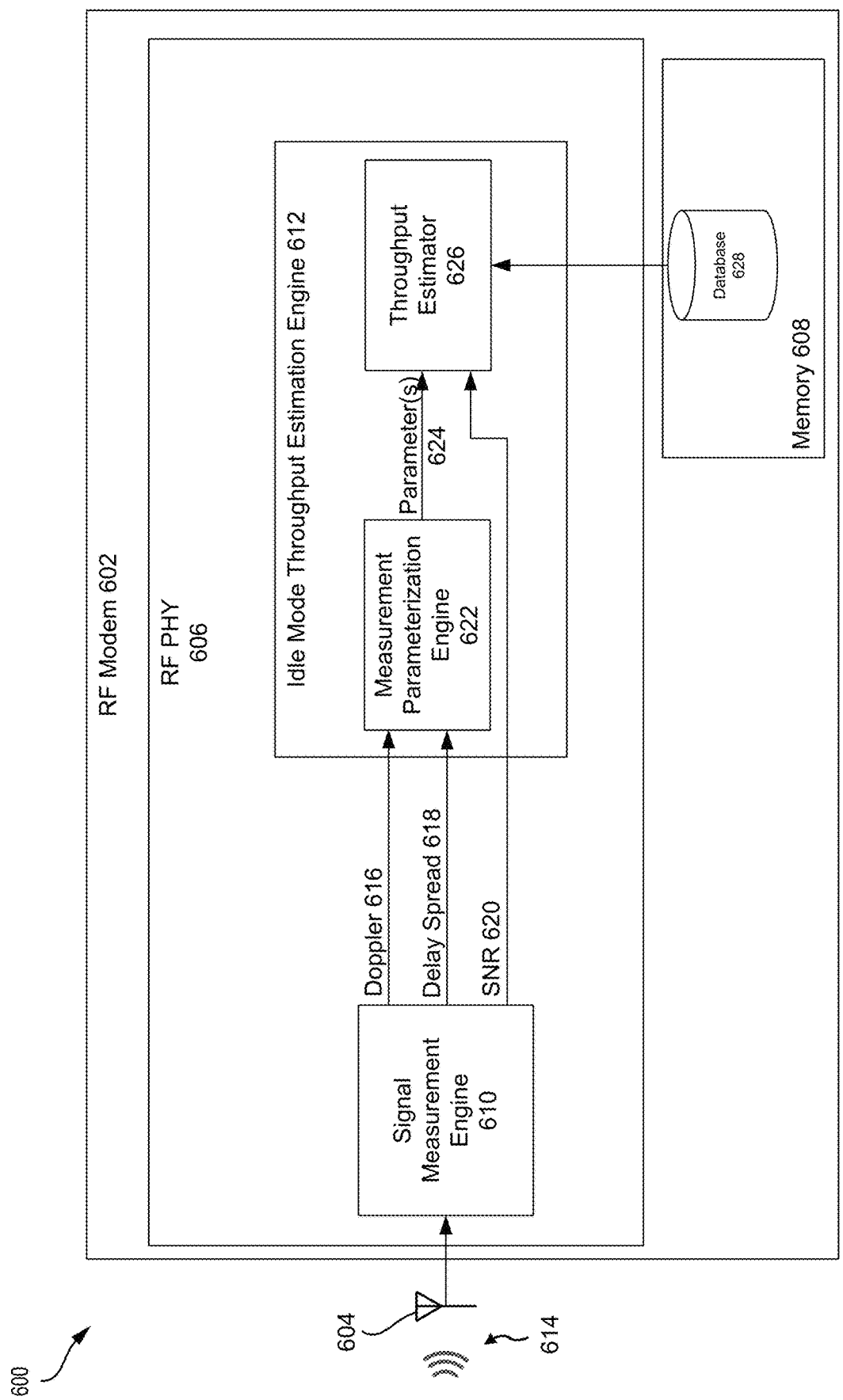
FIG. 6 is a block diagram illustrating an example system configured to perform a technique for idle mode throughput estimation, in accordance with aspects of the present disclosure.

FIG. 6 is a block diagram illustrating an example system configured to perform a technique for idle mode throughput estimation 600, in accordance with aspects of the present disclosure. In FIG. 6, an RF modem 602 is coupled to an antenna 604 and the RF modem 602 includes a RF PHY 606 and a memory 608. The RF PHY 606 includes a signal measurement engine 610 and an idle mode throughput estimation engine 612. In this example, a signal 614, such as a reference signal transmitted from one or more wireless nodes of a wireless network, may be received by antenna 604. In some cases, the one or more wireless nodes may be a cell, a gNB, eNB, a primary cell, secondary cell, a cell from a cell group, BS, AP, etc. The received signal may be measured by the signal measurement engine 610 of the RF PHY 606. The signal measurement engine 610 may apply any known signal measurement technique to measure the received signal. In this example, the signal measurement engine 610 measures and outputs a doppler spread 616, delay spread 618, and SNR 620 measurements of the received signal. The doppler spread 616 measurement measures an amount of spectral widening or narrowing of the received signal, indicating whether the transmitter and receiver are moving closer or further away from each other. The delay spread 618 measures an amount of reflection, refraction and/or scattering of a signal as the signal travels along various different paths from the transmitter to the receiver. The SNR 620 measures a ratio of signal power to noise power. The doppler spread 616 and delay spread 618 measurements may be considered measurements of a channel impairment from the perspective of the PHY layer as it may be more challenging to receive a signal in an environment with a high doppler and high delay spread. In some cases, additional and/or other signal measurements may be made by the signal measurement engine 610, while in the idle mode.

In some cases, one or more signal measurements made by signal measurement engine 610 may be input to a measurement parameterization engine 622. The measurement parameterization engine 622 may determine one or more parameter values based on the input one or more signal measurements. For example, the measurement parameterization engine 622 may determine a parameter value 624 based on the doppler spread 616 and delay spread 618 measurements. In some cases, the measurement parameterization engine 622 may determine the parameter value 624 using a decision tree. In other cases, a machine learning based algorithm or other function (e.g., a non-linear function capable of generating the parameter values given the input signal measurements, lookup table, etc.) may be used to determine the parameter value 624. The parameter value 624 may be passed to a throughput estimator 626.

In some cases, the throughput estimator 626 estimates a throughput of the wireless network as accessed through a cell based on the parameter value 624, the SNR 620 measurement from the signal measurement engine 610, and network capability information stored in memory 608. In some cases, the network capability information may be stored in a database 628. In some cases, the throughput estimator 626 may estimate the throughput of the wireless network using a parameterized version of the Shannon capacity formula using the parameter value 624, the SNR 620 measurement, and stored network capability information. The estimated throughput may be used, for example, to determine whether the wireless device should connect to a particular wireless network. As an example scenario, a wireless device that is capable of connecting to multiple wireless networks (e.g., wireless network operators) may be camped on a first wireless network and in an idle mode with respect to a second wireless network. The wireless device may estimate the throughput of a cell of the second wireless network and compare the estimated throughput with a current throughput of the first wireless network. The wireless device may then decide to switch from the first wireless network to the second wireless network based on the comparison. As another example scenario, a wireless device that is capable of connecting to multiple wireless networks may be in an idle mode with respect to a first wireless network and a second wireless network. The wireless device may estimate throughput of both the first wireless network and the second wireless network (e.g., via their respective cells and/or wireless nodes) and determine which wireless network to connect to.

In some cases, the measurement parameterization engine 622 and throughput estimator 626 may be combined. For example, one or more ML models may be created to predict (e.g., estimate) a throughput of a wireless network directly from the measured signals and stored network capability information.

While discussed in the context of idle mode, estimating the throughput of a cell may also be performed while in a connected mode. For example, signal measurements may be made using signals from a first wireless network of a cell or other wireless nodes of the first wireless network while in a connected mode and used to estimate throughput based on the stored network capability information for those cells. This estimated throughput may be used, for example, to predict future link quality issue and/or introduce preemptive mitigation (e.g., by caching data early, switching to alternative connection(s), force reselection, and/or switch to an edge computing mode from cloud computing mode).

The stored network capability information (e.g., in memory 608) is based on information obtained from the wireless network in a connected mode. For example, the wireless device may initially connect (e.g., enter a connected mode) to a wireless network through a cell. In some cases, the wireless device and the cell may exchange radio resource control (RRC) capability information. The network capability information may be based on the exchanged RRC capability information. For example, a wireless node may request UE capability information from the wireless device and the wireless device may respond with an indication of the capabilities supported by the wireless device. Based on this UE capability information, the wireless node may send to the wireless device one or more RRC messages configuring the wireless connection. For example, the RRC capability information configuring the wireless connection may indicate a QAM capability (e.g., modulation and coding scheme), frequency range, bandwidth parts, number of MIMO layers, number of component carriers, etc. The wireless device may store an indication of one or more portions of the RRC capability information in the memory 608 as stored network capability information. As the RRC capability information may be based on capabilities of both the wireless device and the cell, the RRC capability information may be specific to the cell and wireless devices of a certain capability class. When the wireless device is in an idle state, the wireless device may then later access the stored network capability information when evaluating a signal received from the wireless network via the cell.

The network capability information and stored network capability information indicate a maximum possible (e.g., theoretical) throughput of the wireless network via a cell. For example, the maximum possible throughput may be determined based on the RRC capabilities configured as between the cell and the wireless device, including, but not limited to QAM capability (e.g., modulation and coding scheme), component carriers, frequency range, bandwidth parts, number of MIMO layers, overhead of the layers, etc. In some cases, a maximum possible throughput may be determined per configured component carrier of the cell and then aggregated across the component carriers. In some cases, the maximum possible throughput may also be determined per frequency range and per radio access technology (e.g., 5G NR, LTE, Wi-Fi, etc.). In some cases, the maximum possible throughput per component carrier of a wireless network may be determined and stored, for example, in the memory 608. In some cases, an aggregated maximum possible throughput may be stored.

In some cases, a wireless node of a cell may be associated with one or more other wireless nodes as a primary cell, secondary cell, part of a master cell group, a secondary cell group, etc. The wireless node may indicate one or more associated other wireless nodes of the cell as a part of the network capability information, such as in an RRC message. The wireless device may be configured by the wireless node to access all or a subset of the associated other wireless nodes concurrent with or instead of the wireless node. The wireless device may connect to all or a subset of the associated other wireless nodes and obtain network capability information for the associated other wireless nodes. Network capability information for the associated other wireless nodes may also be stored in the memory 608, along with an indication that the other wireless nodes are associated with the wireless node. In some cases, a determination of the maximum possible throughput of the wireless network may take into consideration whether the wireless node was configured to access all or a subset of the associated other wireless nodes concurrent with or instead of the wireless node. For example, if the wireless device was configured by the wireless node to access both the wireless node and another secondary wireless node of the cell concurrently, then the maximum possible throughput of the wireless network may be determined based on network capability information for both the wireless node and another secondary wireless node.

In some cases, the wireless device may obtain network capability information for a wireless network from a cell and compare this current network capability information to stored network capability information for the wireless network from the cell (e.g., stored in the memory 608). If the current network capability information differs from the stored network capability information, the stored network capability information may be updated based on or in combination with the current network capability information. In one example, the stored network capability information may be replaced by the current network capability information. As another example, the stored network capability information may be combined with the current network capability information based on a weighted average, min/max values, etc. In some cases, the stored network capability information for a wireless network may be updated each time the wireless device connects to the wireless network.

Figure 7:
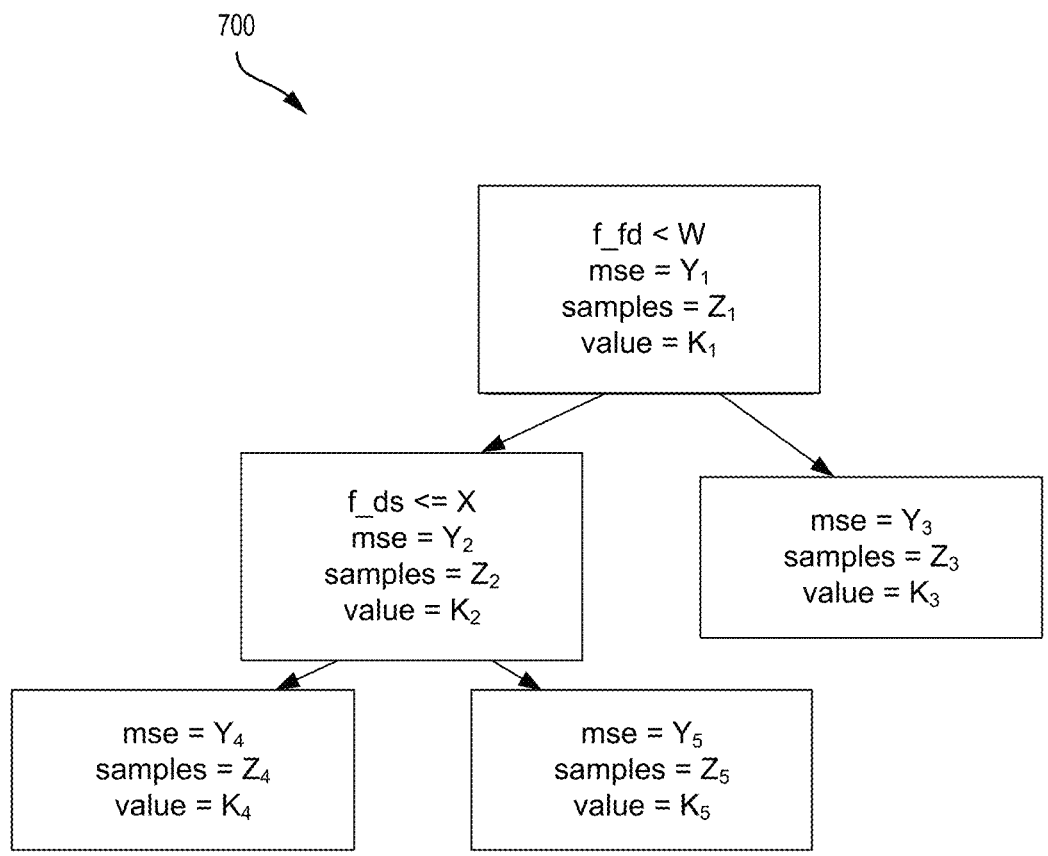
FIG. 7 is a box diagram illustrating an example decision tree, in accordance with aspects of the present disclosure.

As indicated above, the measurement parameterization engine (such as measurement parameterization engine 622) may determine the parameter value based on a decision tree. FIG. 7 is a box diagram illustrating an example decision tree 700, in accordance with aspects of the present disclosure. While decision tree 700 is a three-leaf decision tree, it should be understood that any number of leaves may be used. In some cases, there may be a complexity and/or performance (e.g., accuracy) tradeoff based on the number of leaves. In addition, limiting a number of leaves may help avoid overfitting of the decision tree. In decision tree 700, f_fd represents the doppler value, f_ds represents the delay spread, and the value represents the parameter value. In some cases, the decision tree 700 may also output additional parameter values, such as a minimum parameter value. In some cases, the decision tree 700 may be pre-built for example during a development process. The decision tree 700 may be built using, for example, link level simulations of the wireless system. In some cases, the decision tree 700 may be tuned, for example, to generate parameter values which can optimize for certain objectives, such as to reduce percentage error, bits per second error, etc. While decision tree 700 is based on the doppler value and delay spread, other decision trees may determine the parameter value based on additional PHY measurements that may be made during the idle mode.

In some cases, the decision tree 700 is a per CC. In such cases, parameter values for each CC of a wireless network available from a cell may be determined via a decision tree for each CC and a throughput for each CC estimated. A total estimate throughput may then be determined by summing up the estimated throughput for each CC of the cell.

As indicated above, in some cases, the parameter value determined by the measurement parameterization engine (such as measurement parameterization engine 622) may be input to a throughout estimator (such as throughput estimator 626), which may apply the parameter value to a modified parameterized version of the Shannon formula. In some cases, the parameterized version of the Shannon formula may be expressed as:

$$\hat{T} = \eta T_{cfg},$$

where $\hat{T}$ represents the estimated throughput and $T_{cfg}$ represents the maximum possible (e.g., theoretical) throughput as determined based on the stored network capability information. In the parameterized version of the Shannon formula, $\eta$ is a scaling factor and $\eta$ may represent the following equation:

$$\eta = K(f_{fd}, f_{ds}, \ldots) \times \log(1+\gamma)$$

In the above equation, K is a function of doppler offset, delay spread, and possibly other physical layer measurements, and is determined based on the measured signals (e.g., from measurement parameterization engine 622). In some cases, K may be determined, for example, using a decision tree generated by any kind of classification algorithm, an example of which is shown in FIG. 7. In the above equation, $\gamma$ represents the measured SNR of the signal received from the wireless network. In some cases, further numerical adjustments (e.g., capping, flooring, saturation, etc.) may be applied to limit the range of $\eta$ to between 0 and 1.

As indicated above, the stored network capability information may indicate a maximum possible throughput for a particular cell and a wireless devices of a certain capability class. The maximum possible throughput may differ as between different wireless devices for a given cell. This is because the maximum possible throughput is a function of the wireless device capability and the cell. The wireless device to wireless device difference makes sharing (e.g., crowd sourcing) the network capability information challenging. However, shared stored network capability information may be useful, for example, for wireless devices, such as for newly purchased wireless devices, travelling to a new area, etc. To help allow stored network capability information to be shared, a wireless device may be able to identify the capabilities of the wireless device so other wireless devices with the same capabilities can use the stored network capability information.

To identify wireless devices of the same capability class, the wireless device may hash the wireless device's UE capability message sent to the wireless network as a hash token. This hash token may be used to identify wireless device's capability class to other wireless devices of the same capability class for an online shared database. Different types capability hash tokens may be used. For example, the above-mentioned hash of the wireless device's UE capability message may be used. As another example of a capability has token, the wireless device may hash the band combinations supported by the wireless device. This band combination may be a subset of a full UE capability message, but could allow a more broader (albeit less accurate) sharing.

A wireless device may share stored network capability information by determining capability information with respect to a connected cell of a wireless network and generate a capability message based on the capability information. For example, the wireless device may determine what services and/or features of a cell or wireless node the wireless device supports and generate a UE capability message based on the supported services and/or features. The wireless device may then generate a capability hash token indicating a capability class of the wireless device. This capability hash token may be based on one or more portions of the capability message. For example, the wireless device may hash the wireless device's UE capability message or hash the band combinations, as indicated in the UE capability message, as the capability hash token. The capability hash token may be uploaded along with the stored network capability information to an online shared database.

A wireless device may obtain stored network capability information by generating the capability hash token as described above and transmitting the capability hash token along with or included with a request for stored network capability information from an indicated cell or wireless node (e.g., using an identifier for the cell or wireless node). The wireless device may then receive, based on the capability hash token, stored network capability information for the indicated call or wireless node.

Figure 8:
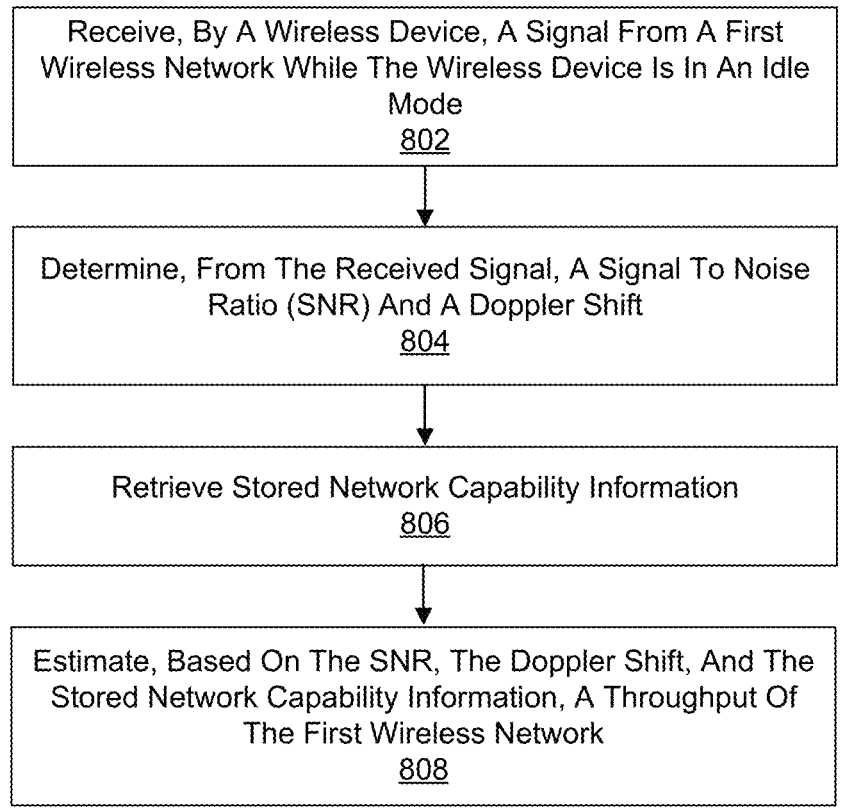
FIG. 8 is a flow diagram of a technique for idle mode throughput estimation, in accordance with aspects of the present disclosure.

FIG. 8 is a flow diagram of a technique for idle mode throughput estimation 800, in accordance with aspects of the present disclosure. At operation 802, the process 800 can include receiving, by a wireless device, a signal from a first wireless network while the wireless device is in an idle mode as shown in FIG. 6. In some cases, the idle mode comprises a radio resource control (RRC) idle mode.

At operation 804, the process 800 can include determining, from the received signal, a signal to noise ratio (SNR) and a doppler shift as shown in FIG. 6. In some cases, the process 800 can include determining a delay spread of the received signal, wherein the throughput of the first wireless network is further estimated based on the delay spread, as shown in FIG. 6.

At operation 806, the process 800 can include retrieving stored network capability information as shown in FIG. 6. In some cases, the stored network capability information is stored in a database or other type of storage or memory.

In some cases, the process 800 can further include determining current network capability information for a second wireless network when the wireless device is connected to the second wireless network. In some cases, the process 800 can also include determining that the stored network capability information for the second wireless network does not match the current network capability information for the second wireless network. In some cases, the process 800 can further include updating the stored network capability information for the second wireless network in the database based on the determination that the stored network capability information does not match the current network capability information.

In some cases, the process 800 can further include connecting, by the wireless device, to the first wireless network. In some cases, the process 800 can also include determining, by the wireless device, current network capability information of the first wireless network. In some cases, the process 800 can further include adding the current network capability information for the first wireless network to the database as the stored network capability information for the first wireless network.

At operation 808, the process 800 can include estimating, based on the SNR, the doppler shift, and the stored network capability information, a throughput of the first wireless network as shown in FIG. 6.

In some examples, the throughput is estimated based on a parameterized Shannon formula. In some examples, the process 800 can also include determining at least one parameter of the parameterized Shannon formula based on the doppler shift. In some examples, the at least one parameter is further determined based on a delay spread of the received signal. In some examples, the at least one parameter is further determined based on a decision tree or a neural network.

In some examples, the stored network capability information comprises stored radio resource control (RRC) capability information for the first wireless network as shown in FIG. 6. In some examples, the process 800 can also include determining, based on the stored RRC capability information, a maximum throughput of the first wireless network as shown in FIG. 6. In some cases, the estimated throughput of the first wireless device is estimated based on the maximum throughput of the first wireless network.

In some examples, the process 800 can further include comparing the estimated throughput of the first wireless network to a throughput of a second wireless network, wherein the wireless device is connected to the second wireless network. In some examples, the process 800 can also include connecting to the first wireless network based on the comparing.

In some examples, the process 800 can further include comparing the estimated throughput of the first wireless network to an estimated throughput of a second wireless network. In some examples, the process 800 can also include connecting to one of the first wireless network or second wireless network based on the comparison.

In some examples, the process 800 can further include generating a capability hash token, the capability hash token indicating a capability class of the wireless device. In some examples, the process 800 can further include transmitting, to a server, the capability hash token. In some examples, the process 800 can also include receiving, based on the capability hash token, stored network capability information for one or more wireless networks.

In some examples, the process 800 can further include determining capability information for a second wireless network when the wireless device is connected to the second wireless network. In some examples, the process 800 can also include generating a capability message for the wireless device based on the capability information, wherein the capability hash token is generated based on at least a portion of the capability message. In some examples, the process 800 can further include transmitting the stored network capability information and capability hash token to a server.

In some examples, the processes described herein (e.g., process 800 and/or other process described herein) may be performed by a computing device or apparatus (e.g., a UE or a base station). In another example, the process 1400 may be performed by the UE 104 of FIG. 1. In another example, the process 1400 may be performed by a computing device with the computing system 900 shown in FIG. 9.

Figure 9:
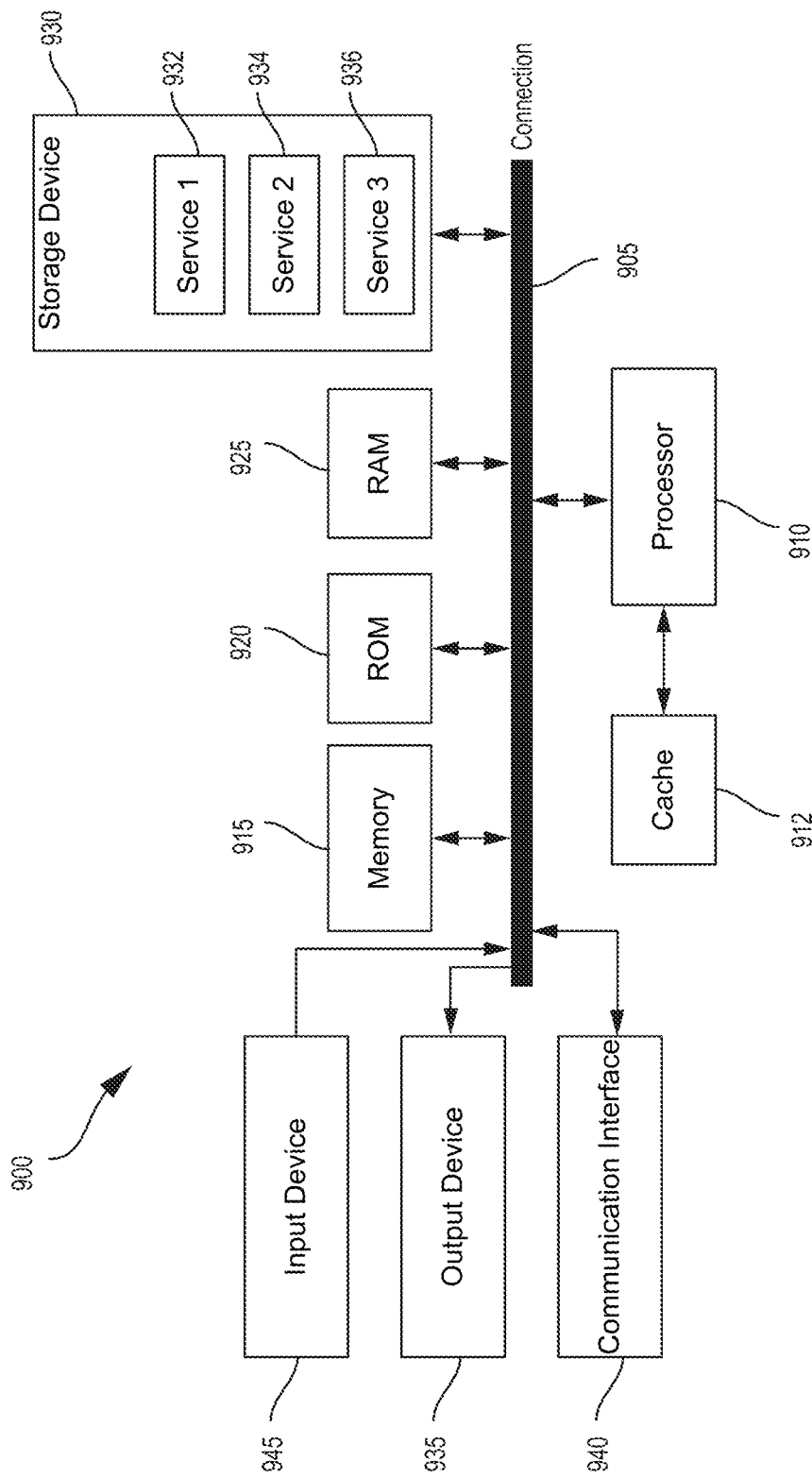
FIG. 9 is a diagram illustrating an example of a computing system, according to aspects of the disclosure.

FIG. 9 is a diagram illustrating an example of a system for implementing certain aspects of the present technology. In particular, FIG. 9 illustrates an example of computing system 900, which may be for example any computing device making up internal computing system, a remote computing system, a camera, or any component thereof in which the components of the system are in communication with each other using connection 905. Connection 905 may be a physical connection using a bus, or a direct connection into processor 910, such as in a chipset architecture. Connection 905 may also be a virtual connection, networked connection, or logical connection.

In some embodiments, computing system 900 is a distributed system in which the functions described in this disclosure may be distributed within a datacenter, multiple data centers, a peer network, etc. In some embodiments, one or more of the described system components represents many such components each performing some or all of the function for which the component is described. In some embodiments, the components may be physical or virtual devices.

Example system 900 includes at least one processing unit (CPU or processor) 910 and connection 905 that communicatively couples various system components including system memory 915, such as read-only memory (ROM) 920 and random access memory (RAM) 925 to processor 910. Computing system 900 may include a cache 912 of high-speed memory connected directly with, in close proximity to, or integrated as part of processor 910.

Processor 910 may include any general purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which may represent any number of input mechanisms, such as a microphone for speech, a touch-sensitive screen for gesture or graphical input, keyboard, mouse, motion input, speech, etc. Computing system 900 may also include output device 935, which may be one or more of a number of output mechanisms. In some instances, multimodal systems may enable a user to provide multiple types of input/output to communicate with computing system 900.

Computing system 900 may include communications interface 940, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L#) cache), resistive random-access memory (RRAM/ReRAM), phase change memory (PCM), spin transfer torque RAM (STT-RAM), another memory chip or cartridge, and/or a combination thereof.

The storage device 930 may include software services, servers, services, etc., that when the code that defines such software is executed by the processor 910, it causes the system to perform a function. In some embodiments, a hardware service that performs a particular function may include the software component stored in a computer-readable medium in connection with the necessary hardware components, such as processor 910, connection 905, output device 935, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to ("≤") and greater than or equal to ("≥") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B.

Illustrative aspects of the disclosure include:

Aspect 1. An apparatus for wireless communications, comprising: at least one memory; and at least one processor coupled to the memory and configured to: receive a signal from a first wireless network while the wireless device is in an idle mode; determine, from the received signal, a signal to noise ratio (SNR) and a doppler shift; retrieve stored network capability information; and estimate, based on the SNR, the doppler shift, and the stored network capability information, a throughput of the first wireless network.

Aspect 2. The apparatus of claim 1, wherein the stored network capability information comprises stored radio resource control (RRC) capability information for the first wireless network.

Aspect 3. The apparatus of claim 2, wherein the instructions further cause the apparatus to determine, based on the stored RRC capability information, a maximum throughput of the first wireless network.

Aspect 4. The apparatus of claim 3, wherein the estimated throughput of the first wireless device is estimated based on the maximum throughput of the first wireless network.

Aspect 5. The apparatus of any one of claims 1 to 4, wherein the instructions further cause the apparatus to: compare the estimated throughput of the first wireless network to a throughput of a second wireless network, wherein the wireless device is connected to the second wireless network; and connect to the first wireless network based on the comparing.

Aspect 6. The apparatus of any one of claims 1 to 5, wherein the instructions further cause the apparatus to: compare the estimated throughput of the first wireless network to an estimated throughput of a second wireless network; and connect to one of the first wireless network or second wireless network based on the comparison.

Aspect 7. The apparatus of any one of claims 1 to 6, wherein the stored network capability information is stored in a database.

Aspect 8. The apparatus of claim 7, wherein the instructions further cause the apparatus to: determine current network capability information for a second wireless network when the wireless device is connected to the second wireless network; determine that the stored network capability information for the second wireless network does not match the current network capability information for the second wireless network; and update the stored network capability information for the second wireless network in the database based on the determination that the stored network capability information does not match the current network capability information.

Aspect 9. The apparatus of any one of claim 7 or 8, wherein the instructions further cause the apparatus to: connect, by the wireless device, to the first wireless network; determine, by the wireless device, current network capability information of the first wireless network; and add the current network capability information for the first wireless network to the database as the stored network capability information for the first wireless network.

Aspect 10. The apparatus of any one of claims 1 to 9, wherein the instructions further cause the apparatus to determine a delay spread of the received signal, wherein the throughput of the first wireless network is further estimated based on the delay spread.

Aspect 11. The apparatus of any one of claims 1 to 10, wherein the throughput is estimated based on a parameterized Shannon formula.

Aspect 12. The apparatus of claim 11, wherein the instructions further cause the apparatus to determine at least one parameter of the parameterized Shannon formula based on the doppler shift.

Aspect 13. The apparatus of claim 12, wherein the at least one parameter is further determined based on a delay spread of the received signal.

Aspect 14. The apparatus of claim 13, wherein the at least one parameter is further determined based on a decision tree or a neural network.

Aspect 15. The apparatus of any one of claims 1 to 14, wherein the idle mode comprises a radio resource control (RRC) idle mode.

Aspect 16. The apparatus of any one of claims 1 to 15, wherein the instructions further cause the apparatus to generate a capability hash token, the capability hash token indicating a capability class of the wireless device.

Aspect 17. The apparatus of claim 16, wherein the instructions further cause the apparatus to: transmit, to a server, the capability hash token; and receive, based on the capability hash token, stored network capability information for one or more wireless networks.

Aspect 18. The apparatus of any one of claim 16 or 17, wherein the instructions further cause the apparatus to: determine capability information for a second wireless network when the wireless device is connected to the second wireless network; generate a capability message for the wireless device based on the capability information, wherein the capability hash token is generated based on at least a portion of the capability message; and transmit the stored network capability information and capability hash token to a server.

Aspect 19. A method for evaluating a wireless network, comprising: receiving, by a wireless device, a signal from a first wireless network while the wireless device is in an idle mode; determining, from the received signal, a signal to noise ratio (SNR) and a doppler shift; retrieving stored network capability information; and estimating, based on the SNR, the doppler shift, and the stored network capability information, a throughput of the first wireless network.

Aspect 20. The method of claim 19, wherein the stored network capability information comprises stored radio resource control (RRC) capability information for the first wireless network.

Aspect 21. The method of claim 20, further comprising determining, based on the stored RRC capability information, a maximum throughput of the first wireless network.

Aspect 22. The method of claim 21, wherein the estimated throughput of the first wireless device is estimated based on the maximum throughput of the first wireless network.

Aspect 23. The method of any one of claims 19 to 22, further comprising: comparing the estimated throughput of the first wireless network to a throughput of a second wireless network, wherein the wireless device is connected to the second wireless network; and connecting to the first wireless network based on the comparing.

Aspect 24. The method of any one of claims 19 to 23, further comprising: comparing the estimated throughput of the first wireless network to an estimated throughput of a second wireless network; and connecting to one of the first wireless network or second wireless network based on the comparison.

Aspect 25. The method of any one of claims 19 to 24, wherein the stored network capability information is stored in a database.

Aspect 26. The method of claim 25, further comprising: determining current network capability information for a second wireless network when the wireless device is connected to the second wireless network; determining that the stored network capability information for the second wireless network does not match the current network capability information for the second wireless network; and updating the stored network capability information for the second wireless network in the database based on the determination that the stored network capability information does not match the current network capability information.

Aspect 27. The method of any one of claim 25 or 26, further comprising: connecting, by the wireless device, to the first wireless network; determining, by the wireless device, current network capability information of the first wireless network; and adding the current network capability information for the first wireless network to the database as the stored network capability information for the first wireless network.

Aspect 28. The method of any one of claims 19 to 27, further comprising determining a delay spread of the received signal, wherein the throughput of the first wireless network is further estimated based on the delay spread.

Aspect 29. The method of any one of claims 19 to 28, wherein the throughput is estimated based on a parameterized Shannon formula.

Aspect 30. The method of claim 29, further comprising determining at least one parameter of the parameterized Shannon formula based on the doppler shift.

Aspect 31. The method of claim 30, wherein the at least one parameter is further determined based on a delay spread of the received signal.

Aspect 32. The method of claim 31, wherein the at least one parameter is further determined based on a decision tree or a neural network.

Aspect 33. The method of any one of claims 19 to 32, wherein the idle mode comprises a radio resource control (RRC) idle mode.

Aspect 34. The method of any one of claims 19 to 33, further comprising generating a capability hash token, the capability hash token indicating a capability class of the wireless device.

Aspect 35. The method of claim 34, further comprising: transmitting, to a server, the capability hash token; and receiving, based on the capability hash token, stored network capability information for one or more wireless networks.

Aspect 36. The method of any one of claim 34 or 35, further comprising: determining capability information for a second wireless network when the wireless device is connected to the second wireless network; generating a capability message for the wireless device based on the capability information, wherein the capability hash token is generated based on at least a portion of the capability message; and transmitting the stored network capability information and capability hash token to a server.

Aspect 37. At least one non-transitory computer-readable medium containing instructions which, when executed by one or more processors, cause the one or more processors to perform a method according to any of Aspects 1 to 36.

Aspect 38. An apparatus comprising means for performing a method according to any of Aspects 1 to 36.

What is claimed is:

1. An apparatus for wireless communications, comprising:
   at least one memory comprising instructions; and
   at least one processor coupled to the at least one memory and configured to:
      receive a signal from a first wireless network while the apparatus is in an idle mode;
      determine, from the received signal, a signal to noise ratio (SNR) and a doppler shift;
      retrieve stored network capability information; and
      estimate, based on the SNR, the doppler shift, and the stored network capability information, a throughput of the first wireless network.

2. The apparatus of claim 1, wherein the stored network capability information comprises stored radio resource control (RRC) capability information for the first wireless network.

3. The apparatus of claim 2, wherein the at least one processor is configured to determine, based on the stored RRC capability information, a maximum throughput of the first wireless network.

4. The apparatus of claim 3, wherein the estimated throughput of the first wireless network is estimated based on the maximum throughput of the first wireless network.

5. The apparatus of claim 1, wherein the at least one processor is configured to:
   compare the estimated throughput of the first wireless network to a throughput of a second wireless network, wherein the apparatus is connected to the second wireless network; and
   connect to the first wireless network based on the comparing.

6. The apparatus of claim 1, wherein the at least one processor is configured to:
   compare the estimated throughput of the first wireless network to an estimated throughput of a second wireless network; and
   connect to one of the first wireless network or second wireless network based on the comparison.

7. The apparatus of claim 1, wherein the stored network capability information is stored in a database.

8. The apparatus of claim 7, wherein the at least one processor is configured to:
   determine current network capability information for a second wireless network when the apparatus is connected to the second wireless network;
   determine that the stored network capability information for the second wireless network does not match the current network capability information for the second wireless network; and
   update the stored network capability information for the second wireless network in the database based on the determination that the stored network capability information does not match the current network capability information.

9. The apparatus of claim 7, wherein the at least one processor is configured to:
   connect to the first wireless network;
   determine current network capability information of the first wireless network; and
   add the current network capability information for the first wireless network to the database as the stored network capability information for the first wireless network.

10. The apparatus of claim 1, wherein the at least one processor is configured to determine a delay spread of the received signal, wherein the throughput of the first wireless network is further estimated based on the delay spread.

11. The apparatus of claim 1, wherein the throughput is estimated based on a parameterized Shannon formula.

12. The apparatus of claim 11, wherein the at least one processor is configured to determine at least one parameter of the parameterized Shannon formula based on the doppler shift.

13. The apparatus of claim 12, wherein the at least one processor is configured to determine the at least one parameter further based on a delay spread of the received signal.

14. The apparatus of claim 13, wherein the at least one processor is configured to determine the at least one parameter further based on a decision tree or a neural network.

15. The apparatus of claim 1, wherein the idle mode comprises a radio resource control (RRC) idle mode.

16. The apparatus of claim 1, wherein the at least one processor is configured to generate a capability hash token, the capability hash token indicating a capability class of the apparatus.

17. The apparatus of claim 16, wherein the at least one processor is configured to:
transmit, to a server, the capability hash token; and
receive, based on the capability hash token, stored network capability information for one or more wireless networks.

18. The apparatus of claim 16, wherein the at least one processor is configured to:
determine capability information for a second wireless network when the apparatus is connected to the second wireless network;
generate a capability message for the apparatus based on the capability information, wherein the capability hash token is generated based on at least a portion of the capability message; and
transmit the stored network capability information and capability hash token to a server.

19. A method for evaluating a wireless network, comprising:
receiving, by a wireless device, a signal from a first wireless network while the wireless device is in an idle mode;
determining, from the received signal, a signal to noise ratio (SNR) and a doppler shift;
retrieving stored network capability information; and
estimating, based on the SNR, the doppler shift, and the stored network capability information, a throughput of the first wireless network.

20. The method of claim 19, wherein the stored network capability information comprises stored radio resource control (RRC) capability information for the first wireless network.

21. The method of claim 20, further comprising determining, based on the stored RRC capability information, a maximum throughput of the first wireless network.

22. The method of claim 21, wherein the estimated throughput of the first wireless device is estimated based on the maximum throughput of the first wireless network.

23. The method of claim 19, further comprising:
comparing the estimated throughput of the first wireless network to a throughput of a second wireless network, wherein the wireless device is connected to the second wireless network; and
connecting to the first wireless network based on the comparing.

24. The method of claim 19, further comprising:
comparing the estimated throughput of the first wireless network to an estimated throughput of a second wireless network; and
connecting to one of the first wireless network or second wireless network based on the comparison.

25. The method of claim 19, wherein the stored network capability information is stored in a database.

26. The method of claim 25, further comprising:
determining current network capability information for a second wireless network when the wireless device is connected to the second wireless network;
determining that the stored network capability information for the second wireless network does not match the current network capability information for the second wireless network; and
updating the stored network capability information for the second wireless network in the database based on the determination that the stored network capability information does not match the current network capability information.

27. The method of claim 25, further comprising:
connecting, by the wireless device, to the first wireless network;
determining, by the wireless device, current network capability information of the first wireless network; and
adding the current network capability information for the first wireless network to the database as the stored network capability information for the first wireless network.

28. The method of claim 19, further comprising determining a delay spread of the received signal, wherein the throughput of the first wireless network is further estimated based on the delay spread.

29. The method of claim 19, wherein the throughput is estimated based on a parameterized Shannon formula.

30. The method of claim 29, further comprising determining at least one parameter of the parameterized Shannon formula based on the doppler shift.

* * * * *